United States Patent
Kikuchi (10) Patent No.: US 7,039,729 B2
(45) Date of Patent: May 2, 2006

(54) DATA TRANSFER APPARATUS

(75) Inventor: Yuji Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 10/443,941

(22) Filed: May 22, 2003

(65) Prior Publication Data
US 2003/0221154 A1     Nov. 27, 2003

(30) Foreign Application Priority Data
May 22, 2002   (JP)  .............................. 2002-147195

(51) Int. Cl.
*G06F 13/00*   (2006.01)
(52) U.S. Cl. ................... 710/33; 714/18; 714/798; 709/232; 378/216; 378/324
(58) Field of Classification Search ............ 710/33–35; 714/18, 821, 798–803; 709/225, 232–237, 709/248; 370/216, 324
See application file for complete search history.

(56) References Cited

U.S. PATENT DOCUMENTS

| | | | | |
|---|---|---|---|---|
| 4,051,355 A | * | 9/1977 | Lin ............................. | 714/15 |
| 4,070,648 A | * | 1/1978 | Mergenthaler et al. ....... | 714/18 |
| 5,191,649 A | * | 3/1993 | Cadambi et al. ............ | 709/225 |
| 5,271,020 A | * | 12/1993 | Marisetty .................... | 714/746 |
| 6,088,829 A | * | 7/2000 | Umemura et al. .......... | 714/798 |
| 6,118,769 A | * | 9/2000 | Pries et al. ................. | 370/324 |
| 6,366,979 B1 | * | 4/2002 | Narayana et al. .......... | 711/109 |
| 6,643,752 B1 | * | 11/2003 | Donnelly et al. ........... | 711/167 |

FOREIGN PATENT DOCUMENTS

| | | |
|---|---|---|
| JP | 64-068145 | 3/1989 |
| JP | 10-247901 | 9/1998 |
| JP | 2000-244530 | 9/2000 |
| JP | 2002-077116 | 3/2002 |

* cited by examiner

*Primary Examiner*—Christopher Shin
(74) *Attorney, Agent, or Firm*—Scully, Scott, Murphy & Presser (57) ABSTRACT

In a data transfer apparatus 10, first, second, third data transmitters 141, 142, 143 are located in a data transmission device 11. Data which must not be influenced by delay of transmission timing of the other data are stored in first, second, third data transmitters 141, 142, 143. The data selector 16 selects these at a predetermined order or frequency to be transmitted to a data reception device 12. As a result, when an uncorrectable trouble is detected by a trouble detecting section 27, a re-issue instruction 21 is issued at a predetermined timing based on information stored in an information round robin section 36. The corresponding data from the corresponding data transmitter 141, 142, or 143 is selected by the data selector 16 and then re-sent.

6 Claims, 6 Drawing Sheets

DATA TRANSFER APPARATUS

BACKGROUND OF THE INVENTION

The present invention relates to a data transfer apparatus which is effective for a case of transferring comparatively large capacity data by a comparatively unreliable interface, for example, a case of reading data out of a memory, writing data into the memory, or transferring address of the memory.

While ranges of use of information processing apparatus, such as a computer, and the like have been enlarged, processing speed of these apparatus have been improved. Under the circumstances, chances in which large capacity data are processed by those apparatus have also been increased. Especially in a system having a large constitution, when the large capacity data are transferred between apparatus, errors are apt to be caused to occur at the same time over a plurality of bits. Accordingly, desired is a reliable data transfer apparatus capable of relieving such errors simultaneously generated over a plurality of bits.

Even in a conventional data transfer apparatus, some countermeasures are taken, in a case that the errors are simultaneously generated over a plurality of bits and thereby correction of the errors becomes impossible. Namely, a countermeasure is taken so that a system carrying out the data transfer may be immediately stopped and then reasons of the errors may be checked. Further, another countermeasure is taken so that the corresponding data may be re-issued from a data output section or data stored in a shunting buffer, such as a re-sending buffer, or the like may be re-issued.

Moreover, yet another countermeasure is taken as follows, in a technique disclosed in an official gazette of unexamined Japanese patent publication, No.2000-244530. Namely, data to be transmitted are divided into a plurality of data each having a predetermined quantity of data and then the divided data are stored in a plurality of sending buffers, respectively. Further, each storing address of these data is memorized by an address memorizing means. Accordingly, in a case that data are transmitted to a transmission destination by a transmission means and then errors are detected, a sending buffer corresponding to the erroneous data is deduced from the address memorizing means and thereby transmission data are re-sent from the deduced sending buffer.

However, in the countermeasure that the system is checked as soon as the correction of the errors becomes impossible, the system is unconditionally stopped for a predetermined time to carry out the check of the system. As a result, a problem of deterioration of reliability is inevitably caused to occur by interruption of the data in a system that data transfer needs to be continuously carried out.

Further, in the countermeasure that the corresponding data are re-issued from the data output section, during the re-issue, progress of transmission of the data to be re-issued is, of course, delayed by the time for the re-issue itself. However, the countermeasure has a problem that progress of transmission of data other than the re-issue data is delayed similarly to that. For example, it is assumed that two kinds of data, namely, data to be sent to a predetermined memory and data to be sent to a predetermined input device, and that a trouble is caused to occur in the data sent to the predetermined memory. In this case, the data to be sent to the predetermined memory are interrupted into data to be outputted in the data output section. As a result, under the influence thereof, progress of transmission of the data to be sent to the predetermined input device is also delayed by the time for the interruption. Similar problem is also caused to occur in the technique disclosed in the official gazette of unexamined Japanese patent publication, No.2000-244530. Accordingly, in these techniques, as regards data having no relation with the troubled data and desired to be transmitted without delay, a problem of deterioration of reliability of the data transfer is inevitably caused to occur.

In order to avoid such a problem, as mentioned before, a proposal is made about the countermeasure that the data are re-sent from the shunting buffer by way of a transmission route different from the data output section. However, in this proposal, it is necessary to prepare not only a special buffer, that is, the shunting buffer but also a special transmission route. As a result, the proposal has a problem that cost of the system is increased by increase of quantity of hardware. In addition, in a case that the corresponding data are re-issued from the shunting buffer at the time of generation of trouble, it is difficult to recognize boundary of the data, order of transferring the data, and the like. Therefore, the re-sent data cannot be recognized correctly in the transmission destination. This sometimes brings about such a phenomenon that, what is called, transformation of characters is caused to occur.

SUMMARY OF THE INVENTION

It is therefore an object of the present invention to provide a data transfer apparatus which is, even though predetermined data are required to be re-sent, capable of preventing transmission of the other data having no relation with the predetermined data from being thereby delayed.

Other objects of the present invention will become clear as the description proceeds.

According to an aspect of the present invention, there is provided a data transfer apparatus comprising:

a plurality of data storing means for storing data of which transmission timing must not be influenced by delay of transmission timing of the other data at least with the data being stored separately to each other;

data selecting means for selecting data per one unit one by one at predetermined frequency and order with respect to said a plurality of data storing means, respectively;

data transmitting means for transmitting said data selected by said data selecting means in synchronization with predetermined clocks one by one per each one clock;

data receiving means for receiving said data transmitted by said data transmitting means;

trouble judging means for checking said data received by said data receiving means per each one clock and judging whether or not an uncorrectable trouble is generated in said data of per said each one clock; and re-sending instructing means for instructing, when said trouble judging means judges that said uncorrectable trouble is generated in said data of per said each one clock, re-sending of said data of said one unit including at least said data of per said each one clock to a corresponding one of said a plurality of data storing means.

According to another aspect of the present invention, there is also provided a data transfer apparatus comprising:

a plurality of data storing means for storing data of which transmission timing must not be influenced by delay of transmission timing of the other data at least with the data being stored separately to each other;

data selecting means for selecting data per one unit one by one at predetermined frequency and order with respect to said a plurality of data storing means, respectively;

data transmitting means for transmitting said data selected by said data selecting means in synchronization with predetermined clocks one by one per each one clock;

data receiving means for receiving said data transmitted by said data transmitting means;

trouble judging means for checking said data received by said data receiving means per each one clock and judging whether or not an uncorrectable trouble is generated in said data of per said each one clock;

trouble correcting means for checking said data received by said data receiving means per each one clock and correcting said data of per said each one clock, when a correctable trouble is generated in said data of per said each one clock;

information round robin means for checking an output data of each one unit outputted from said trouble judging means per each one clock one by one and holding, when said uncorrectable trouble is generated in said data of per said each one clock, not only first information identifying said data storing means that said uncorrectable trouble is generated but also second information indicating a position storing said data that said uncorrectable trouble is generated at least during a period of clocks equal to said data of said one unit; and re-sending instructing means for supplying, when said information round robin means is holding said first and said second information by generation of said uncorrectable trouble, said first and said second information to a corresponding one of said a plurality of data storing means at predetermined timing and for instructing re-sending of said data of at least aid one unit including said position that said uncorrectable trouble is generated.

According to yet another aspect of the present invention, there is also provided a data transfer apparatus comprising:

a plurality of data storing means for storing data of which transmission timing must not be influenced by delay of transmission timing of the other data at least with the data being stored separately to each other;

data selecting means for selecting data per one unit one by one at predetermined frequency and order with respect to said a plurality of data storing means, respectively;

data transmitting means for transmitting said data selected by said data selecting means in synchronization with predetermined clocks one by one per each one clock;

data receiving means for receiving said data transmitted by said data transmitting means;

trouble judging means for checking said data received by said data receiving means per each one clock and judging whether or not an uncorrectable trouble is generated in said data of per said each one clock;

trouble correcting means for checking said data received by said data receiving means per each one clock and correcting said data of per said each one clock, when a correctable trouble is generated in said data of per said each one clock;

first re-sending instructing means for checking an output data of each one unit outputted from said trouble judging means per each one clock one by one and for instructing, when said uncorrectable trouble is generated in said data of per said each one clock, re-sending of said data of said one unit;

memorizing means for memorizing and renewing, in view of delay of time until said data transmitted by said data transmitting means are received by said data receiving means and then said re-sending instructing means instruct said re-sending when said uncorrectable trouble is generated, re-sending information indicating a data storing means and a position thereof from which said data must be re-sent, one by one at timing when said re-sending instruction reaches; and second re-sending instructing means for reading, at the timing when said first re-sending instructing means instructs the re-sending, said re-sending information out of said memorizing means and for supplying the re-sending information to a corresponding one of said a plurality of data storing means and for instructing re-sending of said data of at least said one unit including said position that said uncorrectable trouble is generated.

When said data of said one unit for which said re-sending instructing means instruct the re-sending are outputted from the corresponding data storing means, and a part or a whole of data of one unit following to said data are transmitted from said data transmitting means at previous timing, further comprises a cancellation processing circuit for canceling said data from said received data.

The data transfer apparatus may further comprise a plurality of data processing means which divide said data after correcting said correctable trouble by said trouble correcting means responsive to a kind of the transmitted data to be processed, respectively.

The data transfer apparatus may comprise a plurality of said data selecting means, data selected by said a plurality of said data selecting means being transmitted to said data receiving means by said data transmitting means commonly used for said a plurality of said data selecting means.

DETAILED DESCRIPTION OF THE PREFERRED EMBODIMENTS

Figure 1:
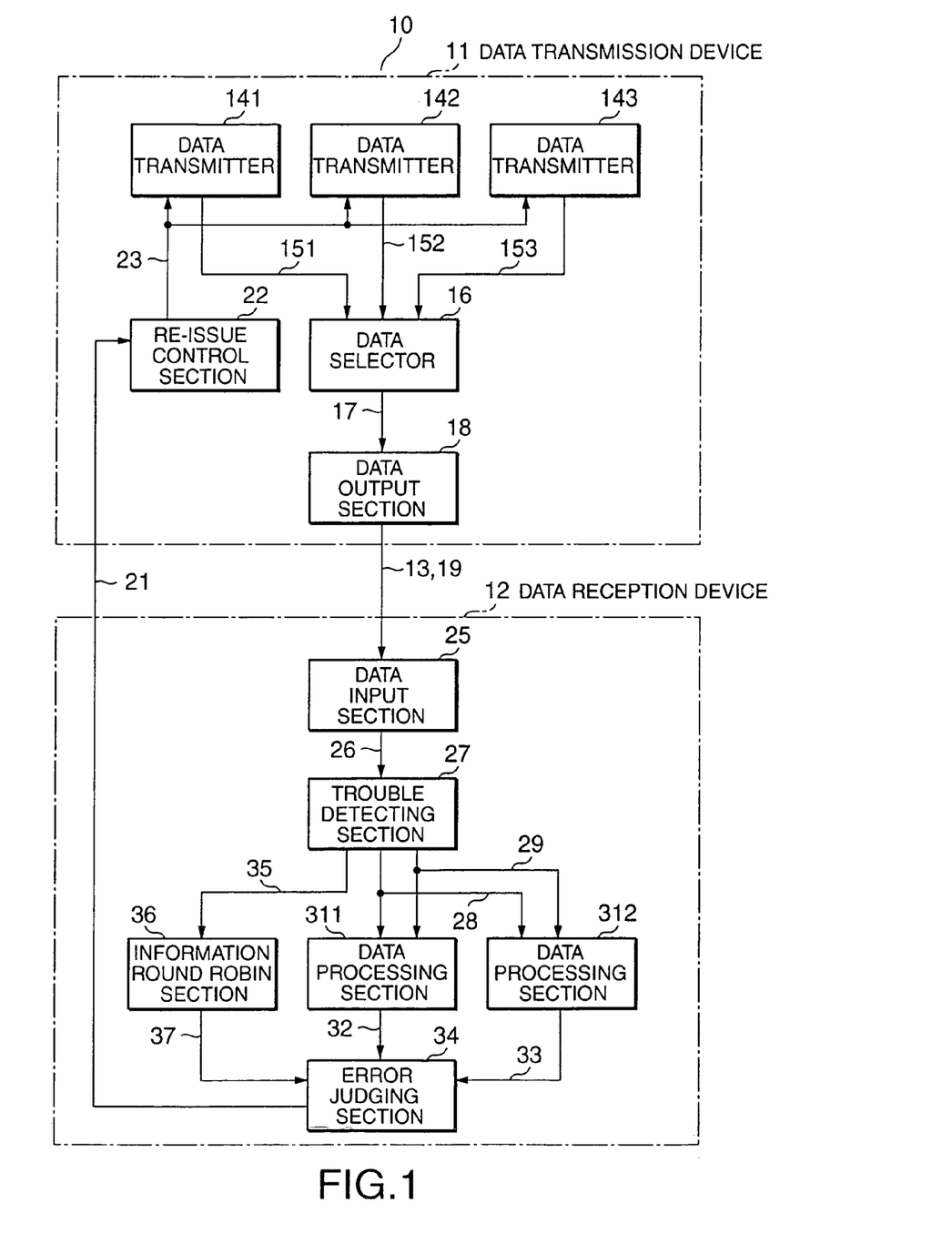
FIG. 1 is a block diagram for schematically showing a constitution of a data transfer apparatus according to a first embodiment of the present invention.

Referring to FIGS. 1 through 5, description will proceed to a data transfer apparatus according to a first embodiment of the present invention. FIG. 1 schematically shows a constitution of the data transfer apparatus according to the first embodiment of the present invention. As illustrated in FIG. 1, the data transfer apparatus 10 comprises a data transmission device 11 which carries out transmission of data, a data reception device 12 which carries out reception of data, and a data transfer means 13 which is located between the data transmission device 11 and the data reception device 12 as an interface having comparatively low reliability. The data transmission device 11 comprises first, second, third data transmitters 141, 142, 143 which output output data 151, 152, 153, respectively, a data selector 16 which selects the output data 151, 152, 153 of the first, second, third data transmitters 141, 142, 143 to be outputted as selected data 17, and a data output section 18 to which the selected data 17 are inputted and which outputs the selected data 17 to the data transfer means 13. In addition, the data transmission device 11 further comprises a re-issue control section 22 to which a re-issue instruction 21 is inputted and which controls the re-issue of transferred data 19, when the transferred data 19 sent to the data reception device 12 have an error and the re-issue instruction 21 is returned from the data reception device 12 to the data transmission device 11. Based on the re-issue instruction 21, the re-issue control section 22 sends a re-issue requirement signal 23 to a corresponding one of the first, second, third data transmitters 141, 142, 143.

Herein, data storing means are composed of the first, second, third data transmitters 141, 142, 143, respectively. The data storing means are for use in storing data of which transmission timing must not be influenced by delay of transmission timing of the other data at least with the data being stored separately to each other. In this embodiment, the first data transmitter 141 receives and stores data written in a first memory (not shown) located at the side of the data reception device 12 one by one. Further, the second data transmitter 142 receives and stores data written in a second memory (not shown) located similarly at the side of the data reception device 12 one by one. Furthermore, the third data transmitter 143 receives and stores data sent to an I/O device (not shown) located similarly at the side of the data reception device 12 one by one.

On the other hand, the data reception device 12 comprises a data input section 25 to which the transferred data 19 sent to the data transfer means 13 from the data output section 18 is inputted. An output data 26 from the data input section 25 is inputted to a trouble detecting section 27. In the trouble detecting section 27, it is detected whether or not the output data 26 has a trouble. With respect to the data sent to the trouble detecting section 27 by one clock, the trouble detecting section 27 judges, by a clock, whether or not the data has a trouble. Further, as regards data for which a correctable trouble, such as one bit error is generated, the trouble detecting section 27 corrects the data. On the other hand, in a case that a trouble is uncorrectable by errors being generated over a plurality of bits at the same time, the trouble detecting section 27 outputs data indicating that.

At the output side of the trouble detecting section 27, first and second data processing sections 311 and 312 which divide the transferred data are located. In this embodiment, data transferred to the above-mentioned first and second memories are stored in the first data processing section 311 while data transferred to the above-mentioned I/O device are stored in the second data processing section 312. Alternatively, three data processing sections 311 can be, of course, prepared in correspondence with the first, second, third data transmitters 141, 142, 143, respectively, although the three data processing sections 311 are not shown in FIG. 1. In this case, it is enough that the transferred data are simply divided one to one.

As illustrated in FIG. 1, general cancel information 32, 33 are outputted from the first, the second data processing sections 311, 312 respectively. The general cancel information 32, 33 are supplied to an error judging section 34 which carries out judgment of errors, respectively. Herein, "general cancel" in this specification is a general re-try of access. The "general cancel" is hereunder explained using an example of a general circuit. For example, in conducting a memory access, when a requirement for reading data from the memory is generated during writing operation of the other data to the memory, a problem of concurrence is inevitably caused to occur. In such a case, a memory access for reading the data is cancelled and then tried again. Furthermore, in conducting a memory access, under the circumstances that a buffer (not shown) for waiting access is filled, it is also necessary that the access is cancelled and then tried again. Namely, information for indicating a cancellation of access thus generally conducted are the general cancel information 32, 33 in this specification. The general cancel information 32, 33 include data effectivity information 29 and ID of the data transmitters 141 through 143 as information of transaction thereof.

A trouble detecting information 35 obtained by the detection of the trouble detecting section 27 is inputted to an information round robin section 36. An error information 37 outputted from the information round robin section 36 is inputted to the error judging section 34. The information round robin section 36 takes the trouble detecting information 35 around, when an uncorrectable trouble is detected. The error information 37 outputted from the information round robin section 36 and the general cancel information 32, 33 are inputted to the error judging section 34. The error judging section 34 thereby issues a re-issue instruction 21 for conducting re-issue of data to the data transmission device 11 under a predetermined condition, as will later be described.

Thus, in the data transfer apparatus 10 in this embodiment, three data transmitters composed of the first, second, third data transmitters 141, 142, 143 are used. These data transmitters 141, 142, 143 are capable of time-division data transmission with one unit of data transferred by a plurality of clocks being a minimum unit. Herein, the data are collected per each kind in which a guarantee of order of transmission is required For example, as regards the data sent from the first data transmitter 141, the order of transmission is guaranteed between data outputted from the first data transmitter 141. However, the order of transmission of the data sent from the first data transmitter 141 is not guaranteed with respect to data outputted from the second or the third data transmitter 142 or 143.

The first, second, third data transmitters 141, 142, 143 are composed of FIFO (First In First Out) buffers, respectively so as to guarantee the order of transmission. The data selector 16 is composed of a circuit called as a selector, and so on which select data by a method, such as round robin scheduling, and the like. Since such a circuit is well known to those skilled in the art, description about a detailed constitution of the circuit is herein omitted. The data output section 18 is composed of a register (not shown) which holds a transferred data in time-division transmission of the data by one unit. The data input section 25 is also composed of a register (not shown), which is located in view of delay of data transfer, and the like. Since the constitutions of these registers are not related to the present invention directly, description about detailed constitutions of the registers is herein omitted. The trouble detecting section 27 has an ECC (Error Correcting Code) control circuit (not shown) and detects both a correctable trouble and an uncorrectable trouble. In a case that the correctable trouble is detected, the trouble detecting section 27 conducts correction of the data, as described before. On the contrary, in a case that the uncorrectable trouble is detected, the trouble detecting section 27 reports the fact that the uncorrectable trouble is detected. Since this circuit is also well known to those skilled in the art, description about a detailed constitution of the circuit is herein omitted.

Figure 2:
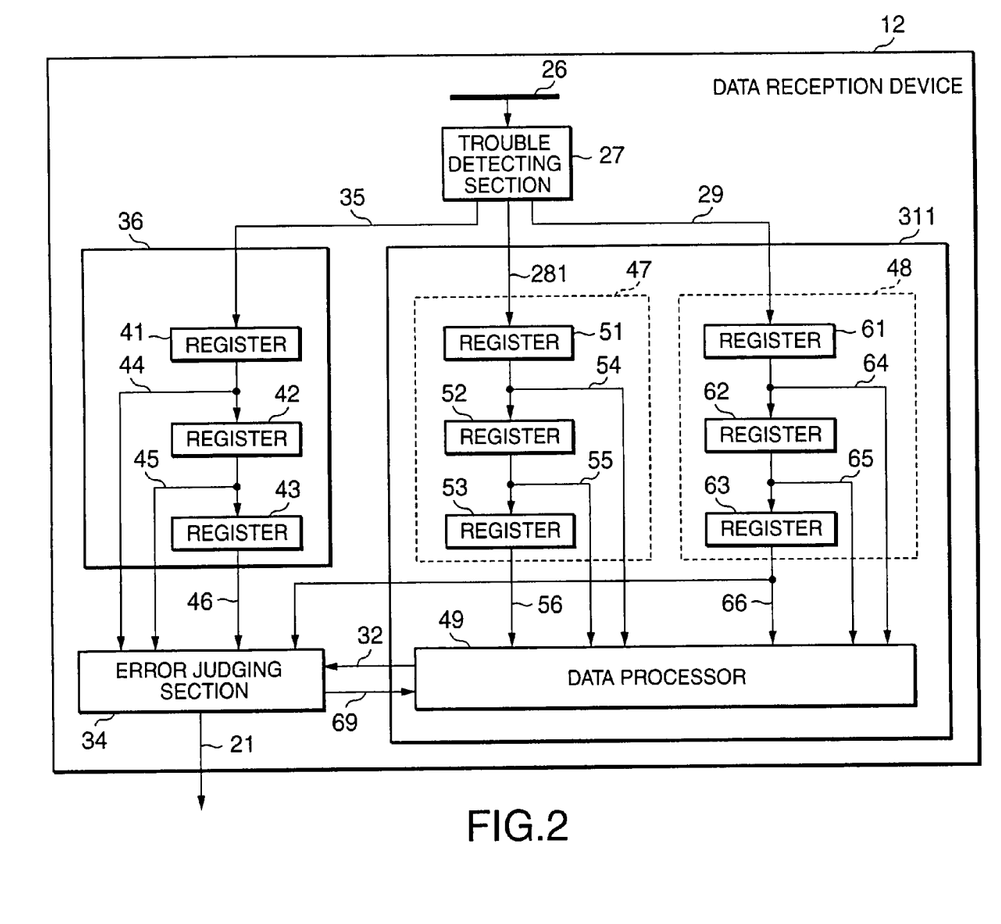
FIG. 2 is a block diagram for schematically showing a characterizing portion of a data reception device of the data transfer apparatus according to the first embodiment.

FIG. 2 shows a characterizing portion of the data reception device 12 of the data transfer apparatus according to this embodiment. In FIG. 2, concretely illustrated is a constitution of the information round robin section 36 to which the trouble detecting information 35 is inputted as an output side of the trouble detecting section 27 to which the output data 26 is inputted. In FIG. 2, also concretely illustrated is a constitution of the first data processing section 311 to which a transferred data 28 is inputted. The second data processing section 312 has a constitution of a circuit similar to that of the first data processing section 311. As a result, illustration of the second data processing section 312 is omitted.

The information round robin section 36 comprises first, second, and third registers 41, 42, and 43 as a serial circuit to which the trouble detecting information 35 is inputted one by one. An output data 44 of the first register 41 is inputted not only to the second register 42 but also to the error judging section 34. An output data 45 of the second register 42 is inputted not only to the third register 43 but also to the error judging section 34. An output data 46 of the third register 43 is inputted to the error judging section 34. Namely, the three output data 44, 45, and 46 are inputted to the error judging section 34 in parallel.

On the other hand, the first data processing section 311 comprises a transferred data processing portion 47, a data effectivity information processing portion 48, and a data processor 49. The transferred data processing portion 47 comprises fourth, fifth, and sixth registers 51, 52, and 53 as a serial circuit to which a transferred data 281 is inputted one by one. An output data 54 of the fourth register 51 is inputted not only to the fifth register 52 but also to the data processor 49. An output data 55 of the fifth register 52 is inputted not only to the sixth register 53 but also to the data processor 49. An output data 56 of the sixth register 53 is inputted to the data processor 49.

The data effectivity information processing portion 48 comprises seventh, eighth, and ninth registers 61, 62, and 63 as a serial circuit to which a data effectivity information 29 is inputted one by one. Herein, the data effectivity information 29 is composed of a part of the transferred data 281. An output data 64 of the seventh register 61 is inputted not only to the eighth register 62 but also to the data processor 49. An output data 65 of the eighth register 62 is inputted not only to the ninth register 63 but also to the data processor 49. An output data 66 of the ninth register 63 is inputted to the data processor 49. Namely, the six output data 54, 55, 56, 64, 65, and 66 are inputted to the data processor 49 in parallel. This is on the assumption that a plurality of data selectors 16 illustrated in FIG. 1 and a plurality of circuit portions previous to the data selectors 16 exist, and that the transferred data 19 outputted from a plurality of data selectors 16 are subjected to a pipeline processing. The output data 66 of the ninth register 63 is also inputted to the error judging section 34 in addition to the data processor 49.

The general cancel information 32 outputted from the data processor 49 is inputted to the error judging section 34. Annulment information 69 from the error judging section 34 is inputted to the data processor 49. Herein, the annulment information 69 is such information for indicating an annulment of data that come to be, by re-sending, overlapping with a previously sent data among data sent from the data transmission device 11 illustrated in FIG. 1.

In the data transfer apparatus 10 of this embodiment having a constitution thus mentioned, respective data of one unit sent from the data transmission device 11 to the data reception device 12 is, as data of three clocks of basic clocks outputted from a clock generator (not shown), transmitted to the data transfer means 13 per each data of one clock one by one. The first data processing section 311 is capable of carrying out processing one by one from the time that a head data of three-divided transferred data 281 reaches. In this point, the second data processing section 312 illustrated in FIG. 1 is similar to the first data processing section 311. In that case, the second data processing section 312 carries out processing one by one from the time that a head data of three-divided transferred data 28 reaches.

The trouble detecting information 35, which is outputted from the trouble detecting section 27 and which is inputted to the information round robin section 36, comprises (1) whether or not uncorrectable trouble exists, (2) an identification number indicating which the output data is outputted from, the first, the second, or the third data transmitter 141, 142, or 143, and (3) a read pointer as a reading position of any one of the first, the second, and the third data transmitters 141, 142, and 143 in the time of re-sending. When the uncorrectable trouble is generated, the error judging section 34 to which the error information 37 is inputted returns, as the re-issue instruction 21, an effectivity flag, the identification number of the first, the second, or the third data transmitter 141, 142, or 143 of round robin information, and the read pointer of the corresponding the first, the second, or the third data transmitter 141, 142, or 143. The error judging section 34 thereby requires the re-issue from the corresponding the first, the second, or the third data transmitter 141, 142, or 143.

In the interim, even if a status of the trouble detecting information 35 indicates that the uncorrectable trouble does not exist, the error judging section 34 issues the re-issue instruction 21 in a case that the general cancel information 32 (33) detected by the first data processing section 311 (second data processing section 312) is active. With respect to one of the first, the second, and the third data transmitters 141, 142, and 143 corresponding to the identification number of the first, the second, or the third data transmitter 141, 142, or 143 of round robin information, the re-issue control section 22 sets the read pointer of the round robin information onto the read pointer of the above-mentioned FIFO buffer. It thereby becomes possible to conduct the re-issue of the output data 151, 152, or 153 from a portion that re-sending is required. In a case that the re-issue of the output data 151, 152, or 153 is conducted, following transferred data issued by slip are annulled in the first (the second) data processing section 311 (312) by transmitting the annulment information 69 to the first (the second) data processing section 311 (312). In the error judging section 34, a decrement counter is located with being corresponding to the identification number of the first, the second, or the third data transmitter 141, 142, or 143 for which the re-issue instruction 21 becomes active. The decrement counter is decremented by fixed numbers of clocks to become "0". When the decrement counter shows values other than "0", the annulment information 69 corresponding to the data transmitter of an issue source becomes active. Accordingly, the above-mentioned processing is carried out.

Figure 3:
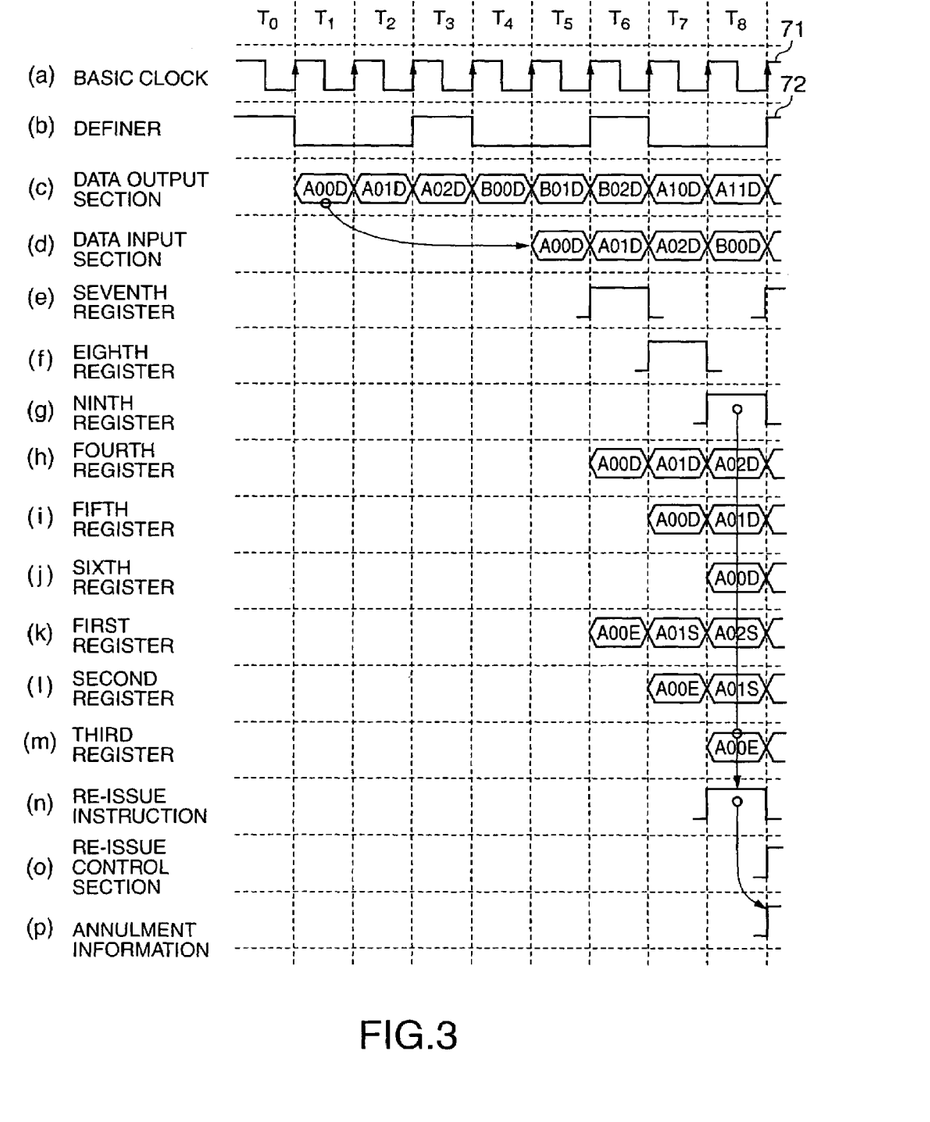
FIG. 3 is a timing chart for showing data transfer operations of the data transfer apparatus according to the first embodiment with time base being divided into a plurality of numbers.
Figure 4:
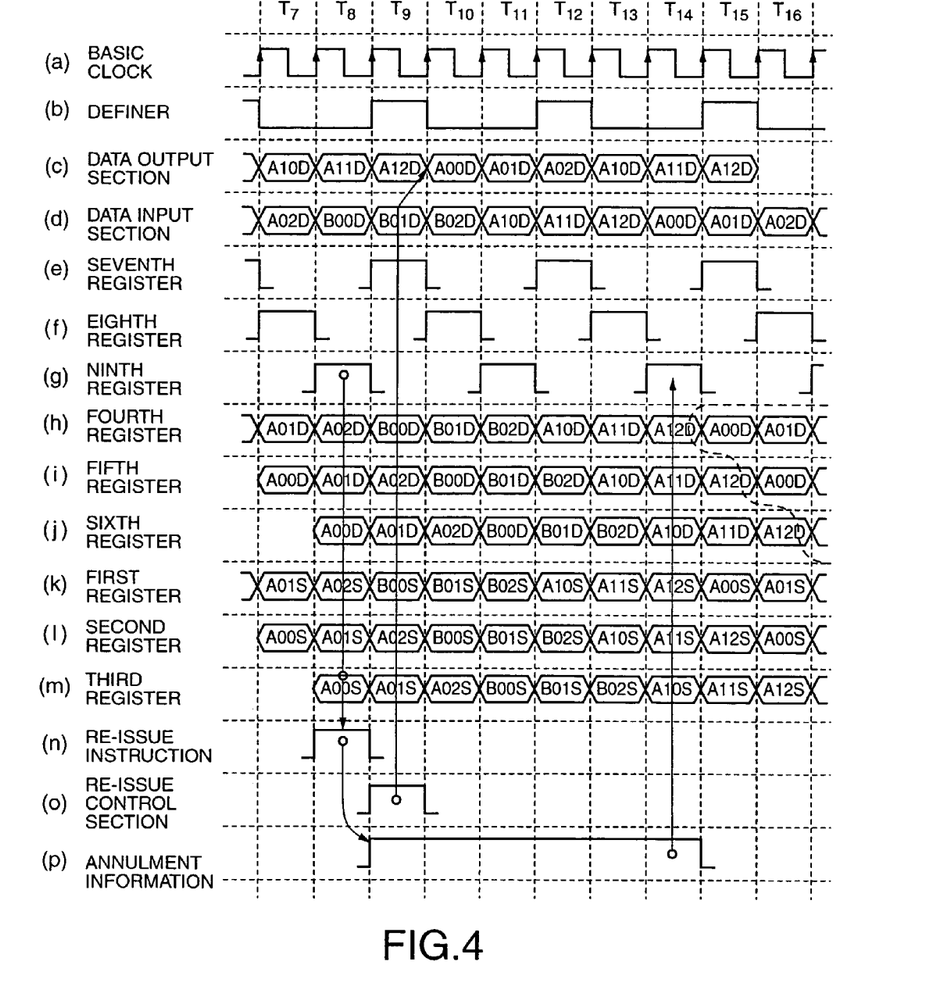
FIG. 4 is a timing chart for showing data transfer operations of the data transfer apparatus according to the first embodiment with time base being divided into a plurality of numbers.
Figure 5:
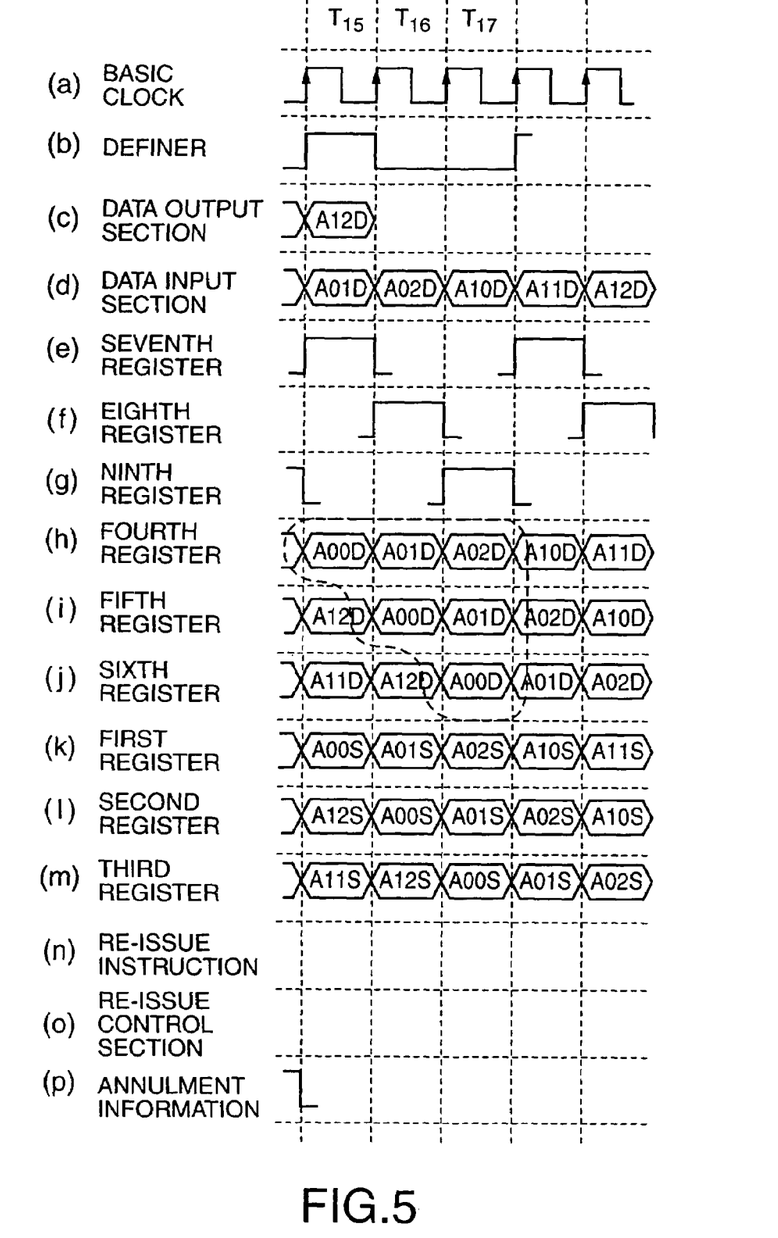
FIG. 5 is a timing chart for showing data transfer operations of the data transfer apparatus according to the first embodiment with time base being divided into a plurality of numbers.

FIGS. 3 through 5 show data transfer operations of the data transfer apparatus according to this embodiment with time base being divided into three. Besides, FIGS. 3, 4, and 5 are partially overlapping with each other. In FIGS. 3 through 5, (a) shows basic clocks 71 used in the data transfer apparatus 10. Time T1, T2, . . . depicted above the basic clocks 71 show respective clock periods.

In FIGS. 3 through 5, (b) shows definers 72. The definers 72 show mediation timing, when the data selector 16 in the data transmission device 11 selects the output data 151, 152, or 153 outputted from the first, the second, or the third data transmitter 141, 142, or 143. In this embodiment, the definers 72 become active once every three clocks of the basic clocks 71. In the example being illustrated, the definers 72 become active at the time T0, T3, T6, . . . respectively.

In FIGS. 3 through 5, (c) shows an example of a constitution of the transferred data 19 transferred by the data output section 18 illustrated in FIG. 1. Herein, a transferred data A shows a data transmitted by the first data transmitter 141 illustrated in FIG. 1 while a transferred data B shows a data transmitted by the second data transmitter 142 illustrated in FIG. 1. It is assumed that a data transmitted by the third data transmitter 143 illustrated in FIG. 1 does not exist within the time period depicted in FIGS. 3 through 5, for the brevity of explanation. Besides, numbers "00" to "02" added to the respective transferred data A, B show an order of the transferred data of one unit as the precedent first half portion. On the other hand, the other numbers "10" to "12" show an order of the transferred data of one unit as the second half portion following to the precedent first half portion.

Symbols "D" added following to the two-digit numbers "00" and the like do not have special meanings in this specification. The symbols "D" are added in order to prevent the numbers "00" and the like from being confused with the other two-digit numbers showing the other parts of circuits in this specification. On the contrary, in FIGS. 3 through 5, depicted are such data in which symbols "S" or symbols "E" are added following to the two-digit numbers. The data to which the symbols "S" are added show trouble detecting information for indicating that the uncorrectable troubles do not exist. On the contrary, the data to which the symbols "E" are added show trouble detecting information for indicating that the uncorrectable troubles exist.

In the interim, it is assumed that transferred data A00D, A01D, A02D as the transferred data of the precedent one unit and transferred data A10D, A11D, A12D as the transferred data following thereto are stored in this order in the FIFO buffer of the first data transmitter 141. Further, it is also assumed that transferred data B00D, B01D, B02D as the transferred data are stored in the FIFO buffer of the second data transmitter 142. Moreover, it is also assumed that, such an interface that the transferred data 19 outputted from the data output section 18 is received by the data input section 25 after four clocks periods of the basic clocks 71 is used as the data transfer means 13 in this embodiment.

In FIGS. 3 through 5, (d) shows a receiving condition of the data input section 25 in the data reception device 12. In the same figures, (e), (f), (g) show storing conditions of the seventh, the eighth, the ninth registers 61, 62, 63 illustrated in FIG. 2, respectively. Further, in the same figures, (h), (i), (j) show storing conditions of the fourth, the fifth, the sixth registers 51, 52, 53 illustrated in FIG. 2, respectively. Furthermore, in the same figures, (k), (l), (m) show storing conditions of the first, the second, the third registers 41, 42, 43 illustrated in FIG. 2, respectively.

On the assumption thus mentioned, it is also assumed that at first, only one unit (of three clocks of the basic clocks 71) of the output data 151 of the first data transmitter 141 is selected by the data selector 16 at the time T0 and decided as a selected data 17 transferred to the data output section 18.

Accordingly, at the next time T1, a first transferred data A00D among the data of one unit is transmitted from the data output section 18 to the data reception device 12 as the transferred data 19.

Further, at the next time T2, a second transferred data A01D among the data of one unit is transmitted from the data output section 18 to the data reception device 12 as the transferred data 19.

At the next time T3, the definers 72 become active, and then next one unit (of three clocks of the basic clocks 71) of the output data 152 of the second data transmitter 142 is selected by the data selector 16 and decided as a selected data 17 transferred to the data output section 18. At this time, a third transferred data A02D among the data of one unit which has already been selected from the first data transmitter 141 is transmitted from the data output section 18 to the data reception device 12 as the transferred data 19.

At the next time T4, a first transferred data B00D among the data of one unit outputted from the second data transmitter 142 is transmitted from the data output section 18 to the data reception device 12 as the transferred data 19.

Further, at the next time T5, a second transferred data B01D among the data of one unit is transmitted from the data output section 18 to the data reception device 12 as the transferred data 19. At this time, as illustrated in FIG. 3(d), the first transferred data A00D transmitted at the time T1 from the data output section 18 is received by the data input section 25 of the data reception device 12 with a delay of four clocks periods of the basic clocks 71.

At the next time T6, the definers 72 become active. However, as described before, data transmitted from the third data transmitter 143 shown in FIG. 1 do not exist at this time. As a result, the output data 151 of the first data transmitter 141 is selected by the data selector 16 again. Thereby, a selected data 17 of one unit (of three clocks of the basic clocks 71) inputted to the data output section 18 is decided. At the time T6, a third transferred data B02D among the data of one unit is transmitted from the data output section 18 to the data reception device 12 as the transferred data 19. Further, at this time T6, the second transferred data A01D is received by the data input section 25 of the data reception device 12.

In the interim, at the above-described time T6, the data effectivity information 29 is received by the seventh register 61. At this time, the first transferred data A00D is received by the fourth register 51. Also at this time, a trouble detecting information A00E for the first transferred data A00D is inputted to the first register 41 in the information round robin section 36 to which the trouble detecting information 35 is inputted. Namely, in this case, it is detected by the trouble detecting section 27 that the first transferred data A00D has the uncorrectable trouble. In this case, the data transfer apparatus 10 has the status that the uncorrectable trouble exists. Thus, the status that the uncorrectable trouble exists is shown by converting the symbol "D" indicated at an end of transferred data into the symbol "E" in this specification.

Further, at the next time T7, a first transferred data A10D among the data of following one unit is transmitted from the data output section 18 to the data reception device 12 as the transferred data 19. At this time, the third transferred data A02D is received by the data input section 25. In addition, the second transferred data A01D is received by the fourth register 51 while the first transferred data A00D is received by the fifth register 52. Also at this time, a trouble detecting information A01S for the second transferred data A01D is received by the first register 41 in the information round robin section 36 to which the trouble detecting information 35 is inputted. Namely, in this case, it is not detected by the trouble detecting section 27 that the second transferred data A01D has the uncorrectable trouble. In this case, the data transfer apparatus 10 has the status that the uncorrectable trouble does not exist. Thus, the status that the uncorrectable trouble does not exist is shown by converting the symbol "D" indicated at an end of transferred data into the symbol "S" in this specification. At this time T7, a trouble detecting information A00E outputted from the first register 41 for the first transferred data A00D is received by the second register 42.

Further, at the next time T8, a second transferred data A11D among the data of following one unit is transmitted from the data output section 18 to the data reception device 12 as the transferred data 19. At this time, the first transferred data B00D is received by the data input section 25. In addition, the third transferred data A02D is received by the fourth register 51 while the second transferred data A01D outputted from the fourth register 51 is received by the fifth register 52. Further, the first transferred data A00D outputted from the fifth register 52 is received by the sixth register 53.

Also at this time, a trouble detecting information A02S for the third transferred data A02D is received by the first register 41 in the information round robin section 86 to which the trouble detecting information 35 is inputted. Namely, in this case, it is not detected by the trouble detecting section 27 that the third transferred data A02D has the uncorrectable trouble. In this case, the data transfer apparatus 10 has the status that the uncorrectable trouble does not exist. At this time T8, a trouble detecting information A01S outputted from the first register 41 for the second transferred data A01D is received by the second register 42. Also at this time, a trouble detecting information A00E outputted from the second register 42 is received by the third register 43. At the time T8, the ninth register 63 receives the data effectivity information 29 to become active. The error judging section 34 is adjusted to output error information 37 on a condition that any one of the first, the second, and the third registers 41, 42, and 43 stores a status of existence of the uncorrectable trouble. On the condition that the error information 37 is outputted and that the ninth register 63 becomes active, the error judging section 34 renders the re-issue instruction 21 to be active, as illustrated in FIG. 4(n).

Further, at the next time T9, based on the re-issue instruction 21 having become active, the re-issue requirement signal 23 is issued from the re-issue control section 22 to the first data transmitter 141 in the data transmission device 11, as illustrated in FIG. 4(o). Based on this, the re-issue output data 151 from the first data transmitter 141 is indicated by a read pointer and selected by the data selector 16. The selected data 17 to the data output section 18 is thereby decided. At this time, a previously selected third transferred data A12D is transmitted from the data output section 18. At this time, the second transferred data B01D is received by the data input section 25. Further, at this time, the data effectivity information 29 from the trouble detecting section 27 is received by the seventh register 61.

Further, the first transferred data B00D is received by the fourth register 51. The third transferred data A02D outputted from the fourth register 51 is received by the fifth register 52. The second transferred data A01D outputted from the fifth register 52 is received by the sixth register 53. Further, also at this time, it is assumed that a trouble detecting information B00S for the first transferred data B00D is received by the first register 41. Namely, in this case, it is not detected by the trouble detecting section 27 that the first transferred data B00D has the uncorrectable trouble. In this case, the data transfer apparatus 10 has the status that the uncorrectable trouble does not exist. At this time T9, a trouble detecting information A02S outputted from the first register 41 is received by the second register 42. A trouble detecting information A01S outputted from the second register 42 is received by the third register 43. Also at this time, the re-issue instruction 21 from the error judging section 34 is received by the re-issue control section 22. By the re-issue instruction 21, the annulment information 69 outputted from the error judging section 34 becomes active, as illustrated in FIG. 4(p).

When a re-sending is conducted for the output data 151 outputted from the first data transmitter 141, an interval that the annulment information 69 is kept active is equal to six clocks of the basic clocks 71. The error judging section 34 memorizes a time for which the annulment information 69 is kept active by the numbers of clocks of the basic clocks 71 as regards the first, the second, the third data transmitters 141, 142, 143, respectively. In this example, the annulment information 69 is kept active in order that an information of generation of cancellation for the first half transferred data of the output data 151 outputted from the first data transmitter 141 may be held until a timing the second half of the output data 151 or the numbers of clocks of the basic clocks 71 of slip (the numbers of transaction) reaches.

Further, at the next time T10, based on the re-issue instruction 21, the first transferred data A00D by the re-sending is transmitted from the data output section 18. At this time, the third transferred data B02D is received by the data input section 25 Further, an output data outputted from the seventh register 61 is received by the eighth register 62. The second transferred data B01D is received by the fourth register 51. The first outputted data B00D outputted from the fourth register 51 is received by the fifth register 52. The third outputted data A02D outputted from the fifth register 52 is received by the sixth register 53. A trouble detecting information B01S for the second transferred data B01D is received by the first register 41. In this case, it is not detected by the trouble detecting section 27 that the second transferred data B01D has the uncorrectable trouble. In this case, the data transfer apparatus 10 has the status that the uncorrectable trouble does not exist. The first outputted data B00S outputted from the first register 41 is received by the second register 42. The third outputted data A02S outputted from the second register 42 is received by the third register 43. The annulment information 69 is kept active.

Further, at the next time T11, the second transferred data A01D by the re-sending is transmitted from the data output section 18. At this time, the first transferred data A10D is received by the data input section 25. Further, an output data outputted from the eighth register 62 is received by the ninth register 63. The third transferred data B02D is received by the fourth register 51. The outputted data B01D outputted from the fourth register 51 is received by the fifth register 52. The first outputted data B00D outputted from the fifth register 52 is received by the sixth register 53. A trouble detecting information B02S for the third transferred data B02D is received by the first register 41. In this case, it is not detected by the trouble detecting section 27 that the third transferred data B02D has the uncorrectable trouble. In this case, the data transfer apparatus 10 has the status that the uncorrectable trouble does not exist. The outputted data B01S outputted from the first register 41 is received by the second register 42. The outputted data B00S outputted from the second register 42 is received by the third register 43.

The annulment information 69 is kept active. At this time, although the ninth register 63 is active, any one of the first, the second, and the third registers 41, 42, and 43 in the information round robin section 36 does not have the status that the uncorrectable trouble exists. As a result, at the time T11, the re-issue instruction 21 does not become active. Accordingly, as regards the data B00D, B01D, and B02D transferred from the second data transmitter 142, processing is normally completed without conducting the re-sending processing.

Further, at the next time T12, the output data 151 from the first data transmitter 141 is selected by the data selector 16. The selected data 17 to the data output section 18 is thereby decided. In addition, the third transferred data A02D is transmitted from the data output section 18. At this time, the second transferred data A11D is received by the data input section 25. Further, the data effectivity information 29 is received by the seventh register 61. The first transferred data A10D is received by the fourth register 51. The output data B02D outputted from the fourth register 51 is received by the fifth register 52. The output data B101D outputted from the fifth register 52 is received by the sixth register 53. A trouble detecting information A10S for the first transferred data A10D is received by the first register 41. In this case, it is not detected by the trouble detecting section 27 that the first transferred data A10D has the uncorrectable trouble. In this case, the data transfer apparatus 10 has the status that the uncorrectable trouble does not exist. The output data B02S outputted from the first register 41 is received by the second register 42. The output data B01S outputted from the second register 42 is received by the third register 43. The annulment information 69 is kept active.

Further, at the next time T13, the first transferred data A10D as a following transmitted data is transmitted from the data output section 18. At this time, the third transferred data A12D is received by the data input section 25. Further, an output data outputted from the seventh register 61 is received by the eighth register 62. The second transferred data A11D is received by the fourth register 51. The output data A10D outputted from the fourth register 51 is received by the fifth register 52. The output data B02D outputted from the fifth register 52 is received by the sixth register 53. A trouble detecting information A11S for the second transferred data A11D is received by the first register 41. In this case, it is not detected by the trouble detecting section 27 that the second transferred data A11D has the uncorrectable trouble. In this case, the data transfer apparatus 10 has the status that the uncorrectable trouble does not exist. The output data A10S outputted from the first register 41 is received by the second register 42. The output data B02S outputted from the second register 42 is received by the third register 43. The annulment information 69 is kept active.

Further, at the next time T14, the second transferred data A11D is transmitted from the data output section 18. At this time, the first transferred data A00D is received by the data input section 25. Further, an output data outputted from the eighth register 62 is received by the ninth register 63. The third transferred data A12D is received by the fourth register 51. The output data A11D outputted from the fourth register 51 is received by the fifth register 52. The output data A10D outputted from the fifth register 52 is received by the sixth register 53. A trouble detecting information A12S for the third transferred data A12D is received by the first register 41. In this case, it is not detected by the trouble detecting section 27 that the third transferred data A12D has the uncorrectable trouble. In this case, the data transfer apparatus 10 has the status that the uncorrectable trouble does not exist. The output data A11S outputted from the first register 41 is received by the second register 42. The output data A10S outputted from the second register 42 is received by the third register 43. The annulment information 69 is kept active. The annulment information 69 makes the data effectivity information of the ninth register 63 be invalid. Namely, the transferred data A10D, A11D, and A12D are completed without conducting processing. On the other hand, a previous processing may be conducted, when the seventh register 61 and the eighth register 62 are active. However, when the ninth register 63 of the last stage is active, all processing are rendered to be invalid.

Further, at the next time T15, the third transferred data A12D is transmitted from the data output section 18 At this time, the second transferred data A01D is received by the data input section 25. Further, the data effectivity information 29 is received by the seventh register 61. The first transferred data A00D is received by the fourth register 51. The third output data A12D outputted from the fourth register 51 is received by the fifth register 52. The second output data A11D outputted from the fifth register 52 is received by the sixth register 53. A trouble detecting information A00S for the first transferred data A00D is received by the first register 41. In this case, it is not detected by the trouble detecting section 27 that the first transferred data A00D has the uncorrectable trouble. In this case, the data transfer apparatus 10 has the status that the uncorrectable trouble does not exist. The output data A12S outputted from the first register 41 is received by the second register 42. The output data A11S outputted from the second register 42 is received by the third register 43. The annulment information 69 inputted to the data processor 49 becomes inactive from this time.

Further, at the next time T16, the third transferred data A02D is received by the data input section 25. Further, an output data outputted from the seventh register 61 is received by the eighth register 62. The second transferred data A01D is received by the fourth register 51. The first output data A00D outputted from the fourth register 51 is received by the fifth register 52. The third output data A12D outputted from the fifth register 52 is received by the sixth register 53. A trouble detecting information A01S for the second transferred data A01D is received by the first register 41. In this case, it is not detected by the trouble detecting section 27 that the second transferred data A01D has the uncorrectable trouble. In this case, the data transfer apparatus 10 has the status that the uncorrectable trouble does not exist. The output data A00S outputted from the first register 41 is received by the second register 42. The output data A12S outputted from the second register 42 is received by the third register 43.

Further, at the next time T17, the first transferred data A10D is received by the data input section 25. Further, an output data outputted from the eighth register 62 is received by the ninth register 63. The third transferred data A02D is received by the fourth register 51. The second output data A01D outputted from the fourth register 51 is received by the fifth register 52. The first output data A00D outputted from the fifth register 52 is received by the sixth register 53. A trouble detecting information A02S for the third transferred data A02D is received by the first register 41. In this case, it is not detected by the trouble detecting section 27 that the third transferred data A02D has the uncorrectable trouble. In this case, the data transfer apparatus 10 has the status that the uncorrectable trouble does not exist. The output data A01S outputted from the first register 41 is received by the second register 42. The output data A00S outputted from the second register 42 is received by the third register 43. At this time, although the ninth register 63 is active, any one of the first, the second, and the third registers 41, 42, and 43 in the information round robin section 36 does not have the status that the uncorrectable trouble exists. As a result, at the time T17, the re-issue instruction 21 does not become active. Accordingly, as regards the data A00D, A01D, and A02D transferred from the first data transmitter 141, processing is normally completed.

Following to the above, as regards following data A10D, A11D, and A12D transferred from the first data transmitter 141, processing is conducted by the steps similar to the above.

Thus, in the example described above, among the data A00D, A01D, and A02D transferred from the first data transmitter 141, the uncorrectable trouble is detected in the first transferred data A00D. Consequently, processing of re-sending is conducted for the first transferred data A00D. However, following transferred data B00D, B01D, and B02D transferred from the second data transmitter 142 are not at all influenced by this processing of re-sending.

As described above, even if the uncorrectable trouble is generated in the data, the data is re-issued from the corresponding data transmitter, similarly to the general cancellation. As a result, an operation of the data transfer can be conducted without influencing following transferred data issued from the other data transmitters.

Namely, there is no time that influences following transfer of data and that is caused by processing of re-sending, even when the uncorrectable trouble is generated. As a result, a performance as a whole of the system is greatly improved. In the example described in this embodiment, among the data A00D, A01D, and A02D transferred from the first data transmitter 141, the uncorrectable trouble is detected in the first transferred data A00D. Consequently, processing of re-sending is conducted for the first transferred data A00D. However, following transferred data B00D, B01D, and B02D transferred from the second data transmitter 142 are not at all influenced by this processing of re-sending. Besides, as regards transferred data A10D, A11D, and A12D issued by slip before the re-issue from the first data transmitter 141, it is necessary that an order of transfer is guaranteed between the transferred data A10D, A11D, A12D and the data A00D, A01D, A02D. In view of this, the data transfer apparatus 10 comprises means for re-sending those data A10D, A11D, and A12D and annulling the re-sent data A10D, A11D, and A12D thereafter. In this embodiment, without adding new functions especially for the uncorrectable trouble, coexistence with the general cancellation function is available. It is not at all necessary that hardware for exclusive use of re-sending is prepared. Thereby, reduction of cost can be achieved in this embodiment.

On the other hand, in a conventional technique, a re-sending instruction is issued to a data transmission device, after a trouble detecting result is obtained in a data reception device. As a result, a flight time of an interface between the data transmission device and the data reception device inevitably appears in a performance of a data transfer apparatus. Further, since following data must wait for their transfer during re-sending, such following data for which an order of transfer does not need to be considered at all is also influenced by the re-sending. Further, in the countermeasure that a re-sending buffer is prepared in a data transmission device and that, every time data is transmitted, the data is stored in the re-sending buffer, the data is re-issued from the re-sending buffer, when a trouble is detected. However, in this countermeasure, quantity of hardware is largely increased. In addition, it becomes necessary to conduct mediation, or the like between output data from the re-sending buffer and general data. Implement thereof is also complicated. However, an advantageous effect that an efficient system can be constituted with a compact hardware in this embodiment.

In the first embodiment thus described above, the data transfer apparatus 10 has the information round robin section 36, so that the trouble detecting information 35 obtained by detection of the trouble detecting section 27 is taken around. However, the information round robin section 36 takes the identification numbers of the data transmitters 141 to 143, and read pointers of the data transmitters 141 to 143 around. As a result, when the uncorrectable trouble exists in these, a data transmitter 141, 142, or 143 of a transmission source cannot be identified. Therefore, the embodiment has a little possibility that data transfer incapable of being relieved is generated. Namely, in a case that an uncorrectable trouble exists in the first transferred data, the data transfer apparatus brings about a system down. Such a problem can be solved by providing a circuit corresponding to the information round robin section 36 in the first embodiment at the side of the data transmission device 11. This will be hereunder described as a second embodiment of the present invention.

Figure 6:
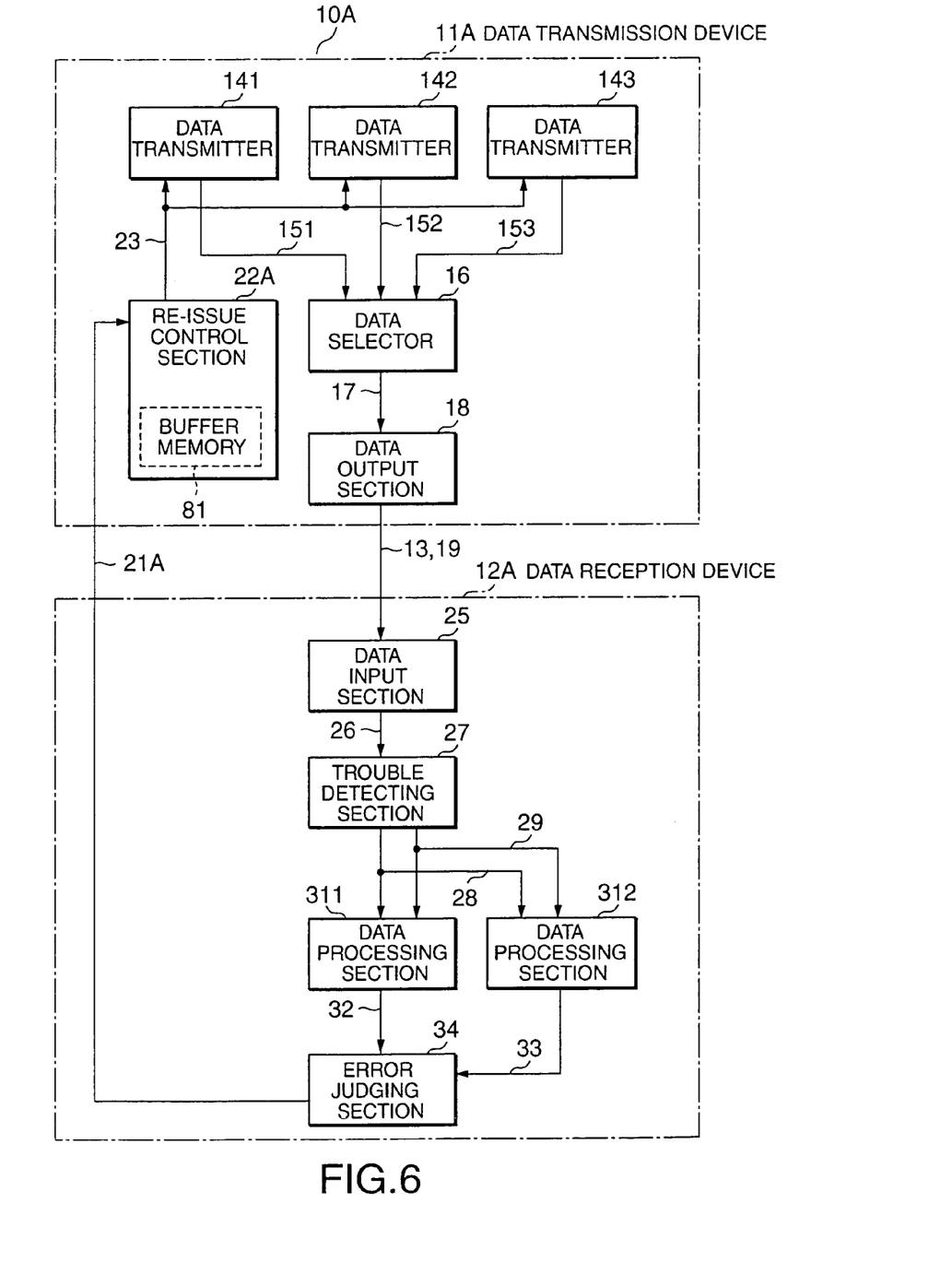
FIG. 6 is a block diagram for schematically showing a constitution of a data transfer apparatus according to a second embodiment of the present invention.

FIG. 6 schematically shows a constitution of a data transfer apparatus according to a second embodiment of the present invention. In FIG. 6, portions similar to those of FIG. 1 are designated by like reference numerals and explanation thereof is omitted accordingly In the data transfer apparatus 10A according to the second embodiment, a re-issue control section 22A in a data transmission device 11A comprises a buffer memory 81. On the other hand, a data reception device 12A does not have the information round robin section 36 (in FIG. 1). A role of the information round robin section 36 is conducted by the buffer memory 81.

Namely, in the data transfer apparatus 10A according to the second embodiment, the identification numbers of the data transmitters 141 to 143 and the read pointers of the data transmitters 141 to 143 each of which is corresponding to a transferred data issued from the data transmitter 141, 142, or 143 are registered in the buffer memory 81 of the re-issue control section 22A one by one. When the uncorrectable trouble is generated, a re-issue instruction 21A having no additional information for the read pointers of the data transmitters 141 to 143, and the like is returned from the error judging section 34.

The number of clocks of the basic clocks 71 (shown in FIG. 3) until a transferred data reaches the error judging section 34 after the transferred data is issued from the data output section 18 is a fixed number. Therefore, in a case that a re-issue instruction 21A is not generated at the timing for generating the re-issue instruction 21A, it is decided that the re-issue does not need to be conducted. Namely, the data transfer apparatus 10A makes the identification numbers of the data transmitters 141 to 143 and the read pointers of the data transmitters 141 to 143 both of which are registered in the buffer memory 81 of the re-issue control section 22A be invalid. At the timing that a data to be transmitted is read out of any one of the data transmitters 141, 142, and 143, an identification number of the data transmitter 141, 142, or 143 and the read pointer of the data transmitter 141, 142, or 143 are written into the buffer memory 81. Then, in a case that a re-issue instruction 21A is active at the timing for generating the re-issue instruction 21A, data indicated by the present read pointer, namely, the identification number of the data transmitter 141, 142, or 143 and the read pointer of the data transmitter 141, 142, or 143 are read out. At the same time, these read pointers are incremented.

On the other hand, in a case that a re-issue instruction 21A is inactive at the timing for generating the re-issue instruction 21A, only increment of the read pointers is conducted. The above-described reading operation is not conducted.

In the second embodiment illustrated in FIG. 6, with the structure thus mentioned, a rate of relieving data in the data transfer means 13 as an interface having low reliability at the time of generation of a trouble is more improved than that of the data transfer apparatus 10 of the first embodiment.

Besides, in the first and the second embodiments, the data transfer is conducted in a three-divided manner. However, the number of division is not restricted to three. The number of division may be any numbers, as far as the number is a positive integer. Further, in the first embodiment, a reaching time of the transferred data 19 from the data transmission device 11 to the data reception device 12 is equal to four clocks of the basic clocks 71. However, this is also not restricted to four. The number of the clocks may be any numbers, as far as the number is a positive integer.

Further, in the first and the second embodiments, the data transmitter is composed of three data transmitters 141, 142, and 143. However, the number of the data transmitter is not restricted to three. Further, these data transmitters 141, 142, and 143 are composed of FIFO memories. The data transmitters 141, 142, and 143 are not restricted to such FIFO memories. For example, a constitution similar to the FIFO memories may be alternatively obtained by conducting a control for protecting an order of transferring data using an arithmetic processing unit, such as a microprocessor, and the like.

Furthermore, in the first and the second embodiments, two data processing sections composed of the first and the second data processing sections 311 and 312 are used. However, the data processing section can, of course, be composed of any numbers of the data processing sections. Further, the data processing section may be composed of a memorizing device, and the like for storing data.

Further, in the first embodiment, an order of transferring data is guaranteed in the same data transmitter 141, 142, or 143 among the first to the third data transmitters 141 to 143. This is not restricted to the above. In such a case that the order of transferring data is not guaranteed, it is not necessary to re-issue the data after receiving the re-issue instruction 21 with being entangled therein by a re-set of an effective flag within the first, the second and the third data transmitters 141, 142 and 143 as regards the data having already been issued. In addition, in this case, it is not necessary to control the annulment information 69 in the error judging section 34. With the control of the annulment information 69 being unnecessary, traffics between the data transmission device 11 (11A) and the data reception device 12 (12A) can be reduced to be more efficient.

Furthermore, in the first embodiment, data transfer means 13 as an interface is rendered to have one to one connection between the data transmission device 11 and the data reception device 12. A plurality of data transmission devices and a plurality of data reception devices may be connected to the data transfer means 13 by using a bus connection, or the like. In a case that a plurality of data transmission devices are used in a single data transfer means 13, a data transmitter of a data transmission source can be identified by taking the numbers of the data transmission devices of a data transmission source around in addition to the identification numbers of the data transmitters 141, 142, 143 and the read pointers of the data transmitters 141, 142, 143.

Moreover, in the first embodiment, definers are used for the mediation timings in the data selector 16. However, it is alternative that the mediations are conducted at any timings and acknowledges from the data output section 18 are waited therefor. Besides, the data output section 18 and the data input section 25 are composed of registers. However, the data output section 18 and the data input section 25 may be composed of the other circuit devices, such as buffers, and the like.

Moreover, in the first embodiment, while the uncorrectable troubles are repeated, re-issues of the data are also repeated. In a case that uncorrectable troubles similar to each other are detected a plurality of times, a check of the system itself may be conducted as a disorder or a trouble each incapable of being restored at the present time. Further, in the first and the second embodiments, ECC control circuits are used for detecting the uncorrectable troubles. Any detecting means, such as a parity check, and the like can also be used.

As described above, according to the present invention, the data transfer apparatus has a plurality of data storing means for storing data of which transmission timing must not be influenced by delay of transmission timing of the other data at least with the data being stored separately to each other, and data selecting means for selecting data per one unit one by one at predetermined frequency and order with respect to said a plurality of data storing means, respectively. In re-sending of data, when the corresponding data storing means is selected, data to be re-sent is read out and is transmitted. As a result, with a simple data processing or a compact circuit device, an efficient data transfer can be realized without influence of a delay by re-sending of the other kind of data. Further, since data is re-sent similarly to a general cancellation, a circuit can be commonly used. It is not at all necessary that hardware for exclusive use of re-sending is prepared. Thereby, reduction of cost can be achieved in the data transfer apparatus.

What is claimed is:

1. A data transfer apparatus comprising:
   a plurality of data storing means for storing data of which transmission timing must not be influenced by delay of transmission timing of the other data at least with the data being stored separately to each other;
   data selecting means for selecting data per one unit one by one at predetermined frequency and order with respect to said a plurality of data storing means, respectively;
   data transmitting means for transmitting said data selected by said data selecting means in synchronization with predetermined clocks one by one per each one clock;
   data receiving means for receiving said data transmitted by said data transmitting means;
   trouble judging means for checking said data received by said data receiving means per each one clock and judging whether or not an uncorrectable trouble is generated in said data of per said each one clock; and
   re-sending instructing means for instructing, when said trouble judging means judges that said uncorrectable trouble is generated in said data of per said each one clock, re-sending of said data of said one unit including at least said data of per said each one clock to a corresponding one of said a plurality of data storing means.

2. A data transfer apparatus comprising:
   a plurality of data storing means for storing data of which transmission timing must not be influenced by delay of transmission timing of the other data at least with the data being stored separately to each other;

data selecting means for selecting data per one unit one by one at predetermined frequency and order with respect to said a plurality of data storing means, respectively;

data transmitting means for transmitting said data selected by said data selecting means in synchronization with predetermined clocks one by one per each one clock;

data receiving means for receiving said data transmitted by said data transmitting means;

trouble judging means for checking said data received by said data receiving means per each one clock and judging whether or not an uncorrectable trouble is generated in said data of per said each one clock;

trouble correcting means for checking said data received by said data receiving means per each one clock and correcting said data of per said each one clock, when a correctable trouble is generated in said data of per said each one clock;

information round robin means for checking an output data of each one unit outputted from said trouble judging means per each one clock one by one and holding, when said uncorrectable trouble is generated in said data of per said each one clock, not only first information identifying said data storing means that said uncorrectable trouble is generated but also second information indicating a position storing said data that said uncorrectable trouble is generated at least during a period of clocks equal to said data of said one unit; and re-sending instructing means for supplying, when said information round robin means is holding said first and said second information by generation of said uncorrectable trouble, said first and said second information to a corresponding one of said a plurality of data storing means at predetermined timing and for instructing re-sending of said data of at least aid one unit including said position that said uncorrectable-trouble is generated.

3. A data transfer apparatus comprising:

a plurality of data storing means for storing data of which transmission timing must not be influenced by delay of transmission timing of the other data at least with the data being stored separately to each other;

data selecting means for selecting data per one unit one by one at predetermined frequency and order with respect to said a plurality of data storing means, respectively;

data transmitting means for transmitting said data selected by said data selecting means in synchronization with predetermined clocks one by one per each one clock;

data receiving means for receiving said data transmitted by said data transmitting means;

trouble judging means for checking said data received by said data receiving means per each one clock and judging whether or not an uncorrectable trouble is generated in said data of per said each one clock;

trouble correcting means for checking said data received by said data receiving means per each one clock and correcting said data of per said each one clock, when a correctable trouble is generated in said data of per said each one clock;

first re-sending instructing means for checking an output data of each one unit outputted from said trouble judging means per each one clock one by one and for instructing, when said uncorrectable trouble is generated in said data of per said each one clock, re-sending of said data of said one unit;

memorizing means for memorizing and renewing, in view of delay of time until said data transmitted by said data transmitting means are received by said data receiving means and then said re-sending instructing means instruct said re-sending when said uncorrectable trouble is generated, re-sending information indicating a data storing means and a position thereof from which said data must be re-sent, one by one at timing when said re-sending instruction reaches; and second re-sending instructing means for reading, at the timing when said first re-sending instructing means instructs the re-sending, said re-sending information out of said memorizing means and for supplying the re-sending information to a corresponding one of said a plurality of data storing means and for instructing re-sending of said data of at least said one unit including said position that said uncorrectable trouble is generated.

4. A data transfer apparatus as claimed in claims 2 or 3, wherein, when said data of said one unit for which said re-sending instructing means instruct the re-sending are outputted from the corresponding data storing means, and a part or a whole of data of one unit following to said data are transmitted from said data transmitting means at previous timing, further comprises a cancellation processing circuit for canceling said data from said received data.

5. A data transfer apparatus as claimed in claims 2 or 3, wherein further comprises a plurality of data processing means which divide said data after correcting said correctable trouble by said trouble correcting means responsive to a kind of the transmitted data to be processed, respectively.

6. A data transfer apparatus as claimed in claims 1, 2 or 3, wherein said data transfer apparatus comprises a plurality of said data selecting means, data selected by said a plurality of said data selecting means being transmitted to said data receiving means by said data transmitting means commonly used for said a plurality of said data selecting means.

* * * * *